L. W. KAUSCH.
SLEIGH RUNNER ATTACHMENT FOR WHEELED VEHICLES.
APPLICATION FILED MAR. 8, 1915.
1,214,685.  Patented Feb. 6, 1917.
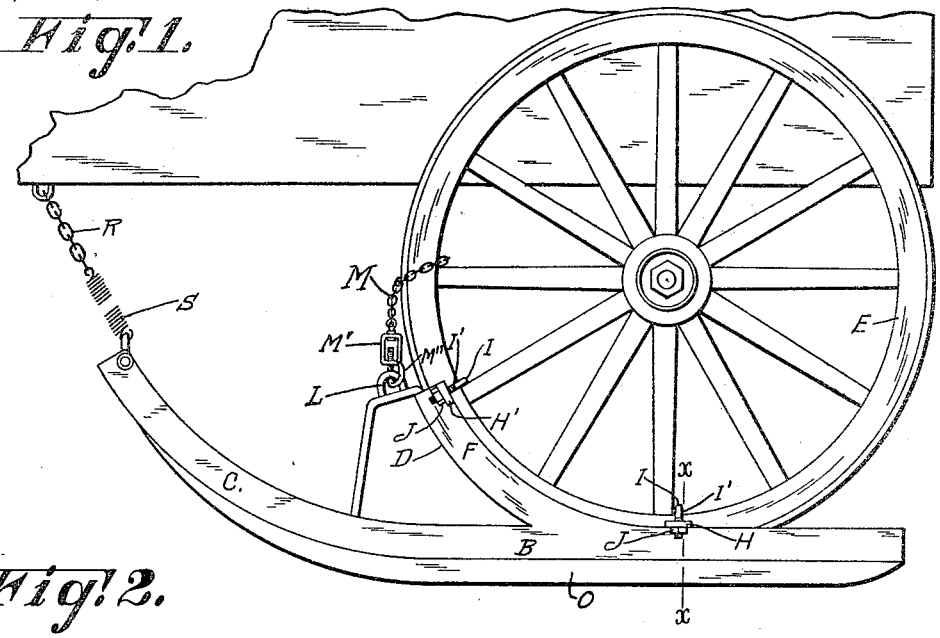
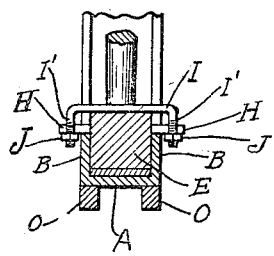
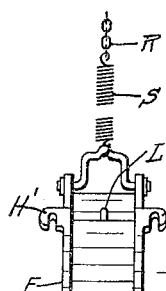
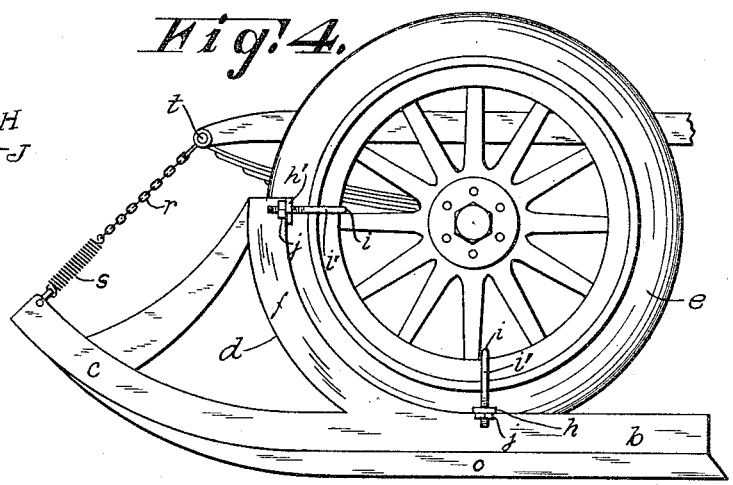
Inventor
Louis W. Kausch
By Erwin & Wheeler
Attorneys

UNITED STATES PATENT OFFICE.

LOUIS W. KAUSCH, OF NORTH MILWAUKEE, WISCONSIN.

SLEIGH-RUNNER ATTACHMENT FOR WHEELED VEHICLES.

1,214,685.     Specification of Letters Patent.    Patented Feb. 6, 1917.

Application filed March 8, 1915. Serial No. 12,788.

*To all whom it may concern:*

Be it known that I, LOUIS W. KAUSCH, a citizen of the United States, residing at North Milwaukee, county of Milwaukee, and State of Wisconsin, have invented new and useful Improvements in Sleigh-Runner Attachments for Wheeled Vehicles, of which the following is a specification.

My invention relates to improvements in sleigh runner attachments for wheeled vehicles.

The object of my invention is to provide effective means for detachably connecting sleigh runners to the wheels of wheeled vehicles in operative relation thereto, whereby the vehicle may be used as a sleigh or as a wheeled vehicle, as conditions may require.

Attempts have heretofore been made to provide wheeled vehicles with sleigh runners, but two difficulties have been encountered, which have heretofore prevented such devices from going into general use. One of these difficulties has been that of securely anchoring the sleigh runner in a proper position for movement over irregular surfaces, and second, in the devices as heretofore used, considerable difficulty has been experienced in adjusting the runners to or removing them from the vehicle wheels.

More specifically stated, my object is to overcome the above mentioned difficulties and provide sleigh runners of the described class which will conform to irregular surfaces by tilting movements upon pivotal axes coincident with the axes of the vehicle axles.

A further object of my invention is to provide a sleigh runner attachment, having a sufficiently broad base to receive a vehicle wheel, but also having one or more narrow runners for contact with the surface over which the vehicle travels, whereby sluing may be largely prevented.

In the drawings Figure 1 is a side elevation showing a fragment of a wheeled vehicle with one of my improved attachments applied thereto. Fig. 2 is a sectional view drawn on line x—x of Fig. 1. Fig. 3 is a detail view of one of the attachments as seen from the rear end. Fig. 4 is a view similar to Fig. 1, showing a modified form of my improved attachment as it is applied to the front wheels of the motor driven vehicle.

Like parts are identified by the same reference characters throughout the several views.

My improved attachment is in the form of a shoe having a base A and raised side walls B, the front end of the shoe being curved upwardly, as shown at C in Fig. 1. Near the upwardly curved front end of the shoe a stop block D is provided, the inner face of which is curved in substantial conformity with the curvature of the wheel E of the vehicle. The block D is also provided with flanges F on each side of the inner or curved face between which flanges the felly and rim of the wheel are received. Means are also employed for anchoring the wheel to the shoe and stop block D. In the drawings I have illustrated the flanges B and F respectively as provided with outwardly projecting ears H, H', to which a clamping yoke I may be secured by means of clamping nuts J. The ears H may be provided with slots to receive the legs I' of the clamping yoke, whereby said clamping yoke may be readily manipulated into and out of position when the nuts J are loosened. The stop block D may also be provided with a staple L to facilitate connecting a chain M with the block. This chain may be passed over one of the spokes of the wheel and subsequently secured to the block. One end of the chain is preferably provided with a swiveled nut M' with which a connecting hook M'' has threaded engagement, whereby the hook may be engaged with the staple L and tension applied to the chain by turning the nut M'.

The bottom A of the runner shoe is provided with a pair of runners O, which are sufficiently narrow to engage the surface over which the runners travel. These runners O will ordinarily cut into a snowy surface to some extent and will engage projections or irregularities upon icy surfaces, thereby preventing sluing or side slipping.

The upwardly curved front end C of the shoe is connected with the vehicle frame or body by a flexible connection, such as a chain R combined with a coiled spring S, which is adapted to allow the shoe to tilt and ride easily over irregular surfaces. This chain and spring may, if desired, be dispensed with, since the shoe is rigidly clamped to the wheel. But I prefer to employ the resilient connection afforded by the chain R and spring S, in order to yieldingly support the front end of the shoe and prevent it from breaking in case of violent pitching motions, such as might result from the device sliding into a deep hole in the roadway.

In Fig. 4, the construction is substantially the same as in Fig. 1, except that a wide runner shoe is provided, whereby an automobile tire may be received between the side flanges. The same reference characters are employed in connection with this modified form of construction, but small case letters are used for the purpose of distinction. It will be observed that the clamping yokes $i$ are provided with longer side arms or legs $i'$ and the stop block $f$ is extended upwardly substantially to the height of the axis, whereby a larger segment of the wheel may be engaged. It will also be observed that the yielding flexible connections $r$, $s$, connect the upwardly curving front end of the shoe with the automobile frame at $t$.

The rear end of the shoe is open as shown in Fig. 3, whereby when the clamping devices I and M are released, the vehicle may be backed away from the shoes, passing freely from the rear end thereof. The shoes may then be loaded on the vehicle, leaving the latter in condition for use as a wheeled vehicle. Where it is not convenient to place the shoes in the body of the vehicle, they may be suspended from the vehicle frame underneath the body. The clamping yokes I and chains M will of course afford a convenient means for thus suspending the shoes, the front ends being left connected with the vehicle body by the flexible connections R and S, if desired.

It will be observed that in both forms of construction illustrated in the drawings, the runner attachment or shoe is rigidly connected with the vehicle wheel while in use as a runner attachment, and with the exception of the yielding connection between the front end of the shoe and the vehicle frame (which may be dispensed with if desired), the runner is free to tilt upon the pivotal axis afforded by the vehicle axle in exactly the same manner that the runners of an ordinary bob sleigh are permitted to tilt, the sleigh knees being pivotally connected with the frame. I therefore not only prevent shocks due to the relative movements of the wheels and runner attachments, but I also provide a runner attachment which is capable of the bobbing movement required in order to permit the runners to conform to irregular surfaces over which they travel.

Owing to the fact that where sleigh runners are attached to the wheels of a vehicle, the tilting point is necessarily high, it is very essential that the front ends of the runners be connected with the vehicle frame in such a manner as to permit a degree of vertical oscillation under increasing resistance, whereby violent oscillations and diving tendencies may be prevented. In the ordinary sleigh, this is not required because the axis of oscillation is relatively low and sufficiently distant from the front and rear ends of the runner shoe so that the tilting axis never approaches a vertical position over the upwardly curving front end of the runner. But where the runner shoes are attached to vehicle wheels the tilting axis is fixed by the diameter of the wheel and is necessarily so high that when the runner shoes pass into depressions such as are frequently formed in deep snow, there is a marked tendency for the front end of the runner shoe to dive, whereupon the entire load of the vehicle is relatively shifted over the forward end of the runner, the vehicle wheel resting upon the stop block instead of upon the base of the runner shoe. In such cases, if the runner shoe encounters additional resistance such, for example, as might be produced by contact of the runner with the ground underneath the snow, it becomes virtually impossible to prevent the vehicle from moving forward over the front end of the runner, breaking the latter or its connection with the wheel.

Attempts have been made to overcome the above difficulty by means of chains connecting the front end of the runner shoe with the vehicle frame, but such chains substantially prevent runner oscillation and a limited degree of oscillation is very desirable. I, therefore, attach great importance to the provision of a connection between the front of the runner and the frame of the vehicle which will resiliently oppose and limit the oscillations but which will permit such oscillations to a desired extent.

The resilient connections above described tend to allow the runner shoes to turn laterally but this laterally turning tendency is in turn opposed by the plurality of narrow runners with which my improved shoes are provided. Therefore, I attach great importance to the fact that my runner shoes are not only resiliently connected with the vehicle frame but are also provided with a plurality of narrow runners which give stability to the shoe in coöperation with the resilient frame connection, the narrow runners opposing lateral oscillations and the resilient connection opposing vertical oscillations.

I claim—

1. A runner attachment for vehicle wheels, comprising a runner shoe in combination with a set of upwardly projecting flanges at the side margins of said shoe, forming a horizontal channel, open at its rear end to receive the wheel, a stop block adapted to fit the wheel and against which the wheel may abut, means for securing the wheel to the stop block and shoe, and flexible resilient connections adapted to secure the forward end of the shoe to the vehicle frame.

2. A runner attachment for vehicle wheels, comprising a shoe having a broad base provided with a wheel receiving socket, open at the rear end of the shoe, and a set of narrow runners underneath the side margins of said base for contact with the surface over which the vehicle travels, together with means for rigidly and detachably clamping the shoe to the felly of the wheel at the bottom and front sides, and means for resiliently connecting the forward end of said shoe with the vehicle frame, whereby vertical oscillation of the shoe may be opposed by said resilient connection, and lateral oscillations prevented by said double runner.

In testimony whereof I affix my signature in the presence of two witnesses.

LOUIS W. KAUSCH.

Witnesses:
LEVERETT C. WHEELER,
EDNA STARKEY.

Copies of this patent may be obtained for five cents each, by addressing the "Commissioner of Patents, Washington, D. C."